(12) United States Patent
Murata

(10) Patent No.: US 6,181,952 B1
(45) Date of Patent: Jan. 30, 2001

(54) UNIT AND SYSTEM FOR MOBILE COMMUNICATIONS

(75) Inventor: Makoto Murata, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/389,376

(22) Filed: Sep. 3, 1999

Related U.S. Application Data

(63) Continuation of application No. PCT/JP98/05507, filed on Dec. 7, 1998.

(51) Int. Cl.$^7$ ........................................................ H04B 1/38
(52) U.S. Cl. ..................... 455/552; 455/426; 455/432; 455/456; 455/67.1
(58) Field of Search ......................... 455/426, 427, 455/432, 456, 457, 507, 514, 551, 552, 553, 558, 186.1, 67.1

(56) References Cited

U.S. PATENT DOCUMENTS

| 5,732,359 | * | 3/1998 | Baranowsky, II et al. | 455/552 |
| 5,950,127 | * | 9/1999 | Nitta et al. | 455/426 |

FOREIGN PATENT DOCUMENTS

| 3158028 | 7/1991 | (JP) . |
| 435327 | 2/1992 | (JP) . |
| 7226973 | 8/1995 | (JP) . |
| 9121376 | 5/1997 | (JP) . |

* cited by examiner

*Primary Examiner*—Nguyen Vo
*Assistant Examiner*—Lester G. Kincaid
(74) *Attorney, Agent, or Firm*—Rothwell, Figg, Ernst & Manbeck

(57) ABSTRACT

A mobile communication unit that receives communications services of a cellular communication system within the service area of the cellular communication system and receives communications services of a satellite communication system outside the service area. The mobile communication unit includes a state monitor for monitoring the state of services of the satellite communication system, a memory in which information about the service areas of the cellular communication system is stored, a decision circuit, and a switching controller. If the state monitor detects deterioration of the state of services of the satellite communication system, the decision circuit makes a decision based on the information stored in the memory as to whether the present location of the unit itself is within the service areas of the cellular communication system. If the result of the decision made by the decision circuit is that the present location of the unit itself is outside the service area, the switching controller maintains the services of the satellite communication system. If the present location is within the service areas, the switching controller switches to the services of the cellular communication system.

7 Claims, 11 Drawing Sheets

UNIT AND SYSTEM FOR MOBILE COMMUNICATIONS

CROSS REFERENCE TO RELATED APPLICATION

This application is a continuation of application Ser. No. PCT/JP98/05507, filed Dec. 7, 1998.

BACKGROUND OF THE INVENTION

1. Field of the Invention

The present invention relates to a mobile communication unit that receives communications services from a cellular communication system if the unit is located within the service area of the cellular communication system and receives communications services from a satellite communication system if the unit is outside the service area. The invention also relates to a mobile communication system utilizing such a mobile communication unit.

2. Description of the Related Art

A dual-mode mobile communication system using dual-mode mobile communication terminals capable of connecting with both a cellular communication system and a satellite communication system has been heretofore available as a mobile communication system for offering wide-coverage mobile communications services to users. Each mobile communication terminal used for such a dual-mode mobile communication system is designed, for example, to detect the reception levels at the systems, to preferentially select a communication system with higher reception power, and to register its location or request connection with the network.

FIG. 11 is a block diagram of the related art mobile communication terminal described in Japanese Unexamined Patent Laid open No. 116949/1997. In FIG. 11, a satellite-based mobile station transmitter 55 and a satellite-based mobile station receiver 56 are connected with a satellite-based mobile station antenna 72 via a transmit-receive switch (DUT) 80. A ground mobile station transmitter 57 and a ground mobile station receiver 58 are connected with a ground mobile station antenna 73 via a transmit-receive switch (DUT) 81. The outputs of a control signal generator circuit 91 and of a voice encoder circuit 92 are connected with the inputs of the transmitters 55, 57, respectively. The outputs of the receivers 56 and 58 are connected with the inputs of a control signal analyzer 93 and of a voice decoder circuit 94, respectively. The input of the voice encoder circuit 92 and the output of the voice decoder circuit 94 are connected with a handset 96. The ground mobile station receiver 58 is connected with a reception level detector circuit 95 whose output is connected with a mobile phone controller 90.

If this mobile communication terminal 30 moves into a location where the reception level of a signal transmitted from a base station of a ground cellular telephone system is in excess of a given level, the location is registered in the base station of the cellular communication system so that the communication mode is switched from the satellite-based communication system to the ground-based communication system. For example, if the reception level detector circuit 95 of the mobile communication terminal 30 detects a reception power exceeding the minimum permissible level of the ground cellular telephone, the mobile communication terminal 30 causes the control signal generator circuit 91 to generate a so-called random access signal (hereinafter referred to as the location registration-requesting signal) for making a request for connection of the ground cellular phone with the network. This location registration-requesting signal is sent to a wireless base station of the ground-based cellular telephone system via the ground mobile station transmitter 57, the transmit-receive switch 81, and the ground mobile station antenna 73.

The mobile communication terminal 30 that is the related art mobile communication unit is constructed as described thus far. The terminal does not make a decision as to whether its present location is within the service area of ground cellular telephone network. The base station of the ground cellular telephone network makes this decision. Even if the reception level detector 95 detects a power exceeding the minimum permissible level for the ground cellular telephone, there is a possibility that the mobile communication terminal 30 is not in the service area of the ground cellular telephone network in practice. Under this condition, if the mode is switched based on the result of the decision made by the reception level detector circuit 95, and if a location registration-requesting signal is sent to the wireless base station of the ground cellular telephone network, then the base station of the ground cellular telephone network rejects it on the grounds that the requested location does not exist within the service area of the ground cellular telephone network. Therefore, there exists a possibility that request for connection of the ground cellular telephone network cannot be made in spite of the cellular processing in the mobile communication terminal 30.

Some mobile communication terminals are designed to operate only one of the satellite-based and ground-based systems because of power saving requirement. Because of the structure, the terminal is urged to receive services of one of these two communication systems at a time. If the above-described situation takes place in the mobile communication system of this construction, it is impossible to make a request for connection with either system. In this way, the continuity of the communications services given to the users using these communication systems has presented problems.

SUMMARY OF THE INVENTION

It is an object of the present invention to provide novel mobile communication terminals (mobile communication units) and mobile communication system which permit the mode of operation to be switched between plural communication systems reliably and with greatly reduced power consumption and can offer communications services of improved continuity to users.

A mobile communication unit in accordance with the present invention receives communications services of a cellular communication system if the unit is within the service area of the cellular communication system and receives communications services of a satellite-based communication system if the unit is outside the service area. The mobile communication unit comprises a state monitor for monitoring the services of the satellite-based communication system, a memory in which information about the service area of the cellular communication system is stored, a decision circuit for making a decision as to whether the location of the unit itself is within the service area of the cellular communication system based on the information stored in the memory, if the state monitor detects deterioration of the state of the services of the satellite communication system, and a switching controller. If the result of the decision made by the decision circuit is that the location of the unit itself is outside the cellular service area, the switching controller maintains the services of the satellite communication system. If the location of the unit itself is within the cellular service area, the switching controller switches the reception from the services of the satellite communication system to the services of the cellular communication system. In this way, the services of the satellite communication system is continued until it is confirmed that the present location of the unit itself is within the service area of the cellular communication system. This assures that the connection is switched between the two communication systems. Furthermore, the continuity of the communications services offered to users is assured. In addition, wasteful power consumption produced when the reception is switched can be reduced greatly.

The decision circuit described above makes a decision as to whether the location of the unit itself is within the selected service area. This makes it unnecessary to make decisions regarding every service area stored in the memory. The time taken to make a decision for switching of the reception state can be shortened. The power necessary for the decision processing can be reduced.

The memory described above consists of a storage means that can be detached from the body of the mobile communication unit. This makes it unnecessary to previously load the body of the unit with information about the service areas. In updating the information about the service areas, a decision as to the present location of the unit itself can be made based on the newest information about the service areas, simply by replacing the memory in use by a new storage device in which new information about the service areas is stored. Furthermore, the present location of the unit itself can be judged according to each service area if information about individual service areas is stored.

The present invention also provides another mobile communication unit that receives communications services of a cellular communication system if the unit is within the service area of the cellular communication system and receives communications services of a satellite-based communication system if the unit is outside the service area. This mobile communication unit comprises a state monitor, a memory, a decision circuit, and a switching controller. The state monitor monitors the state of services from the satellite communication system. Information about connection with the cellular communication system within the service area (i.e., connected and unconnected locations) is stored in the memory as network connection information. If the state monitor detects deterioration of the state of services from the satellite communication system, the decision circuit makes a decision as to whether the present location of the unit itself is in a connected location or in an unconnected location with the cellular communication system within the service area depending on the network connection information stored in the memory. If the result of the decision made by the decision circuit is that the location of the unit itself is in any one of the aforementioned unconnected locations within the service area, the switching controller maintains the services of the satellite communication system. If the present location of the unit itself is in any one of the connected locations within the service area, the switching controller switches the services from the satellite communication system to the cellular communication system. This can prevent the reception of communications services from being switched in the unconnected locations within the service area of the cellular communication system. The services of the satellite communication system is maintained until it is confirmed that the location of the unit itself is in any one of the connected locations within the service area of the cellular communication system. This assures that the connection is switched between the two kinds of communication systems. The communications services to the user are maintained. Wasteful electric power consumption involved in switching of the state of reception can be reduced greatly.

The above-described memory consists of a nonvolatile memory that holds the contents of the memory for a given period if the power supply is interrupted. Therefore, if the supply of the power is interrupted for along time because of failure of the power supply, the contents of the memory can be retained.

A mobile communication system in accordance with the present invention comprises satellite communication base stations for offering communications services of a satellite communication system via satellite stations, cellular communication base stations connected with the satellite communication base stations and offering communications services of a cellular communication system, and mobile communication units. Each mobile communication unit makes a decision as to whether the present location of the unit itself is within the service area of the cellular communication system, based on information about the service area of the cellular communication system. If the present location of the unit itself is within the service area of the cellular communication system, the unit receives communications services of the cellular communication system. If the present location of the unit itself is outside the service area of the cellular communication system, the unit receives communications services of the satellite communication system. The information about the cellular service area is sent to the service area of the satellite communication system via the satellite stations. Therefore, the mobile communication unit whose body does not have any memory storing information about the service area of the cellular communication system can obtain information about the service area of the cellular communication system. If the service area of the cellular communication system is enlarged or modified, information about the new service area associated with the enlargement or modification is periodically sent to the unit via the satellite communication system. Consequently, the user of the present mobile communication unit can modify the information about the new service area without taking any means at all for modification of the information about the service area.

Other objects and features of the invention will appear in the course of the description thereof, which follows.

DETAILED DESCRIPTION OF THE PREFERRED EMBODIMENTS

The preferred embodiments of the present invention are hereinafter described in detail by referring to the accompanying drawings. In the description of the present invention, it is assumed that a cellular communication system consists of cellular communication systems (hereinafter, a cellular communication system is referred to as a cellular communication system).

Figure 1:
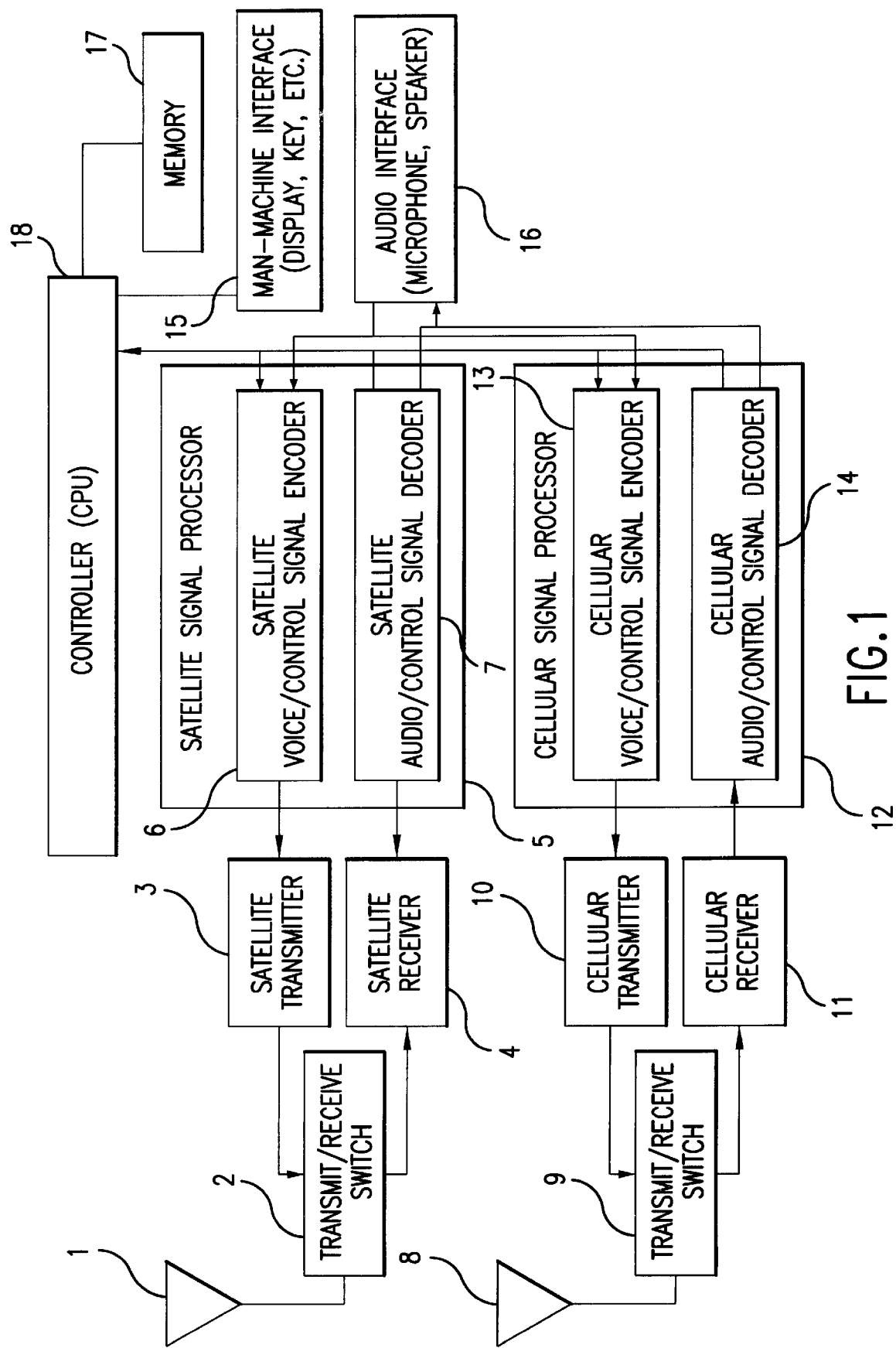
FIG. 1 is a schematic block diagram of a mobile communication unit in accordance with a first embodiment of the present invention.
Figure 2:
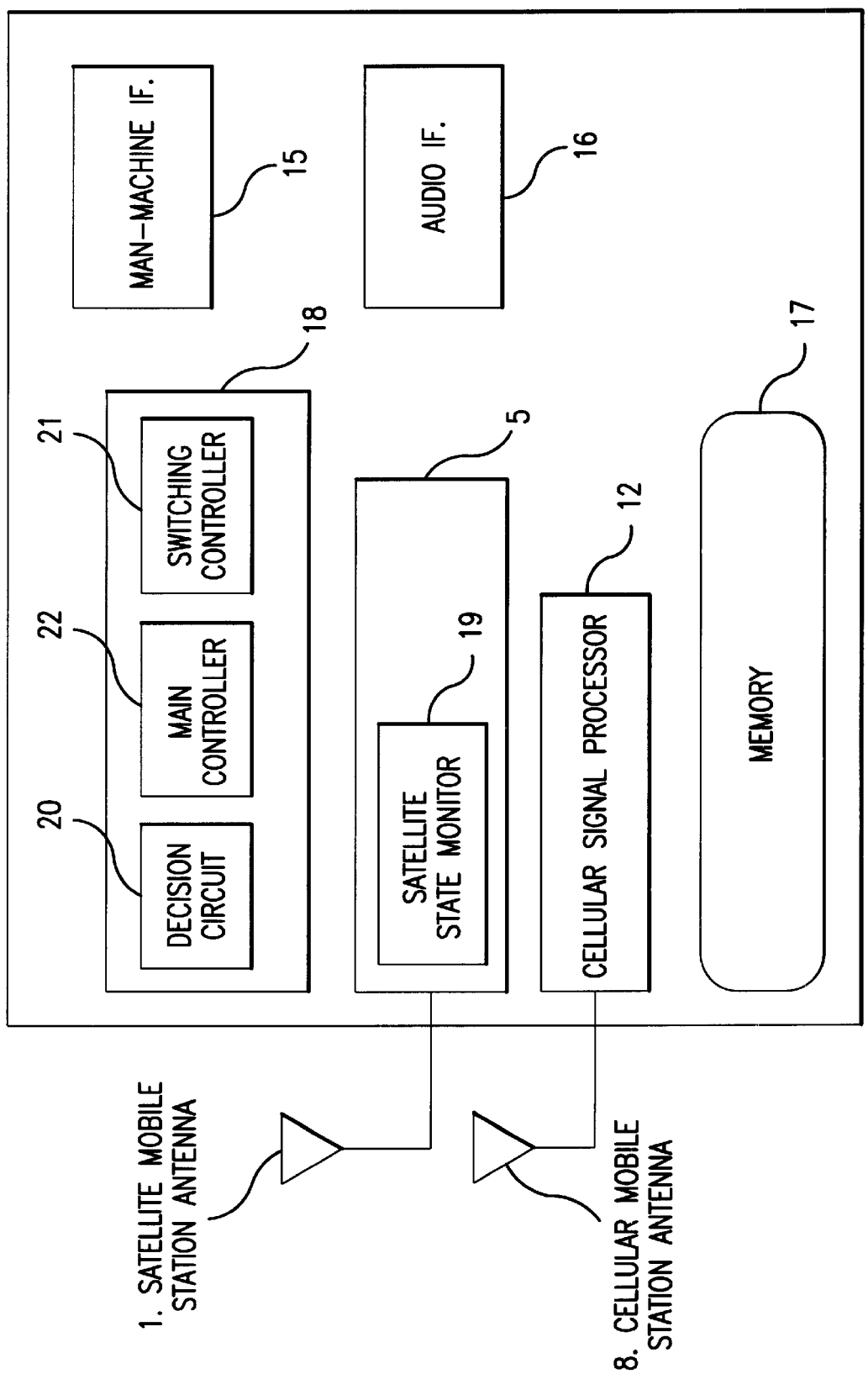
FIG. 2 is a block diagram of main operational components of the mobile communication unit shown in FIG. 1.

FIGS. 1 and 2 are block diagrams showing a mobile communication unit in accordance with a first embodiment of the invention. In FIG. 1, reference numeral 1 denotes a satellite mobile antenna with which a satellite transmitter 3 and a satellite receiver 4 are connected via a transmit/receive switch 2, numeral 5 denotes a satellite signal processor which has a satellite voice/control signal encoder 6 and a satellite voice/control signal decoder 7 which are connected with the satellite transmitter 3 and the satellite receiver 4, respectively and which sends and receives signals to and from a satellite communication system and monitors the state of reception of signals from the satellite communication system as described later. Reference numeral 8 denotes a cellular mobile station antenna connected with a cellular transmitter 10 and a cellular receiver 11 via a transmit/receive switch 9. Numeral 12 represents a cellular signal processor which has a cellular voice/control signal encoder 13 and a cellular voice/control signal decoder 14 connected with the cellular transmitter 10 and the cellular receiver 11, respectively and which sends and receives signals to and from a cellular communication system. Numeral 15 represents man-machine interface which has a call make/get button and numerical keys for entering phone numbers, 16, an audio interface made up of a microphone, a loudspeaker, and so on, and 17, a memory where information about the service area (described later) of the cellular communication system and other information (e.g., phone numbers of other users, shortened phone numbers, communications history, and contents of conversations) is stored. Numeral 18 denotes mobile phone controller (CPU) which is connected with each of the satellite signal processor 5, the cellular signal processor 12, the man-machine interface 15, and the memory 17 and causes the signal processors 5 and 12 to send or receive signals in accordance with a preset processing program or in accordance with a control signal from the man-machine interface 15. Furthermore, the controller 18 makes a decision to determine the present location of the unit itself according to the result of the monitoring of the state of services (described later) from the satellite communication system. The controller switches the service reception mode of the present mobile communication unit between the satellite communication system and the cellular communication system.

As shown in FIG. 2, the satellite signal processor 5 incorporates a satellite system monitor 19 (hereinafter, referred to as a state monitor) for monitoring the state of services from the satellite communication system via the satellite mobile station antenna 1, the satellite receiver 4, and the satellite signal processor 5. The mobile phone controller 18 comprises a decision circuit 20, a switching controller 21, and a main controller 22. The decision circuit 20 makes a decision as to whether the present location of the unit itself is within the service area of the cellular communication system, based on a first kind of information about the present location of the unit itself and on a second kind of information about the service area of the cellular communication system. The first kind of information has been derived from the communication circuit (the satellite mobile station antenna 1, the transmit-receive switch 2, the satellite transmitter 3, the satellite receiver 4, and the satellite signal processor 5) of the satellite communication system. The second kind of information is stored in the memory 17. The switching controller 21 switches the mode of operation between the satellite communication system and the cellular communication system (consisting of the ground mobile station antenna 8, the transmit-receive switch 9, the cellular transmitter 10, the cellular receiver 11, and the cellular signal processor 12) by a mechanical or electrical switching means. The main controller 22 controls the operation of the respective communication systems according to the preset processing program.

Figure 11:
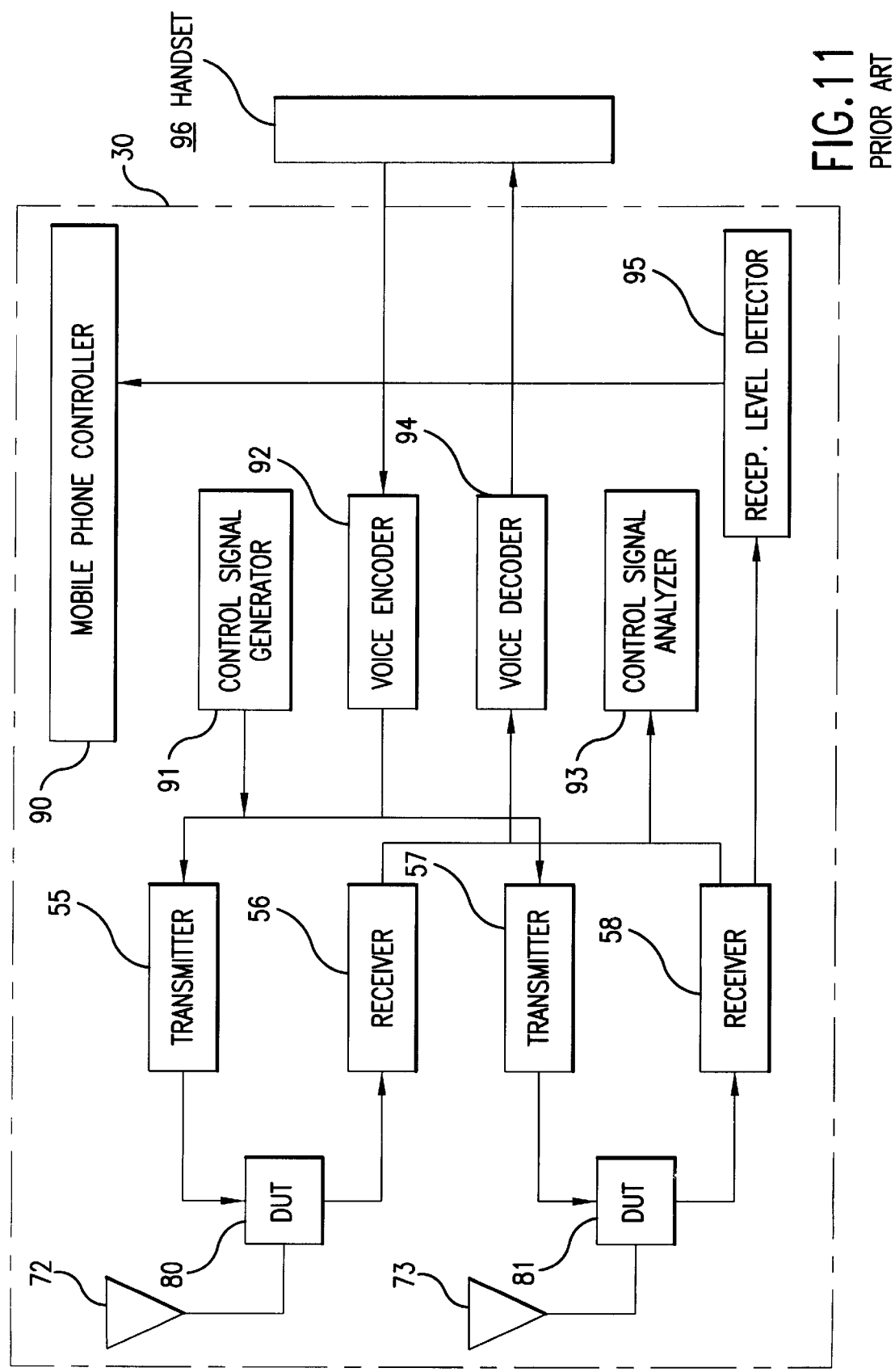
FIG. 11 is a block diagram of a related art mobile communication unit.

The mobile communication unit in accordance with the present embodiment is a so-called dual-mode mobile communication unit capable of receiving services from both satellite communication system and cellular communication system as shown in FIGS. 1 and 2. Because there is a demand for power consumption saving, only one of the two communication systems (either the satellite communication system or the cellular communication system) selected by the mobile phone controller 18 is operated at one time. In the related art mobile communication unit as shown in FIG. 11, which causes both communication systems to operate simultaneously, it is possible to compare the reception levels corresponding to both communication means but the electric power consumption is increased accordingly. The wait time and talk time are much shorter than those of the device in which only one communication system is operated. Where the identical wait time and talk time are secured, a larger capacity power supply must be used. Hence, the portability presents a problem.

Figure 3:
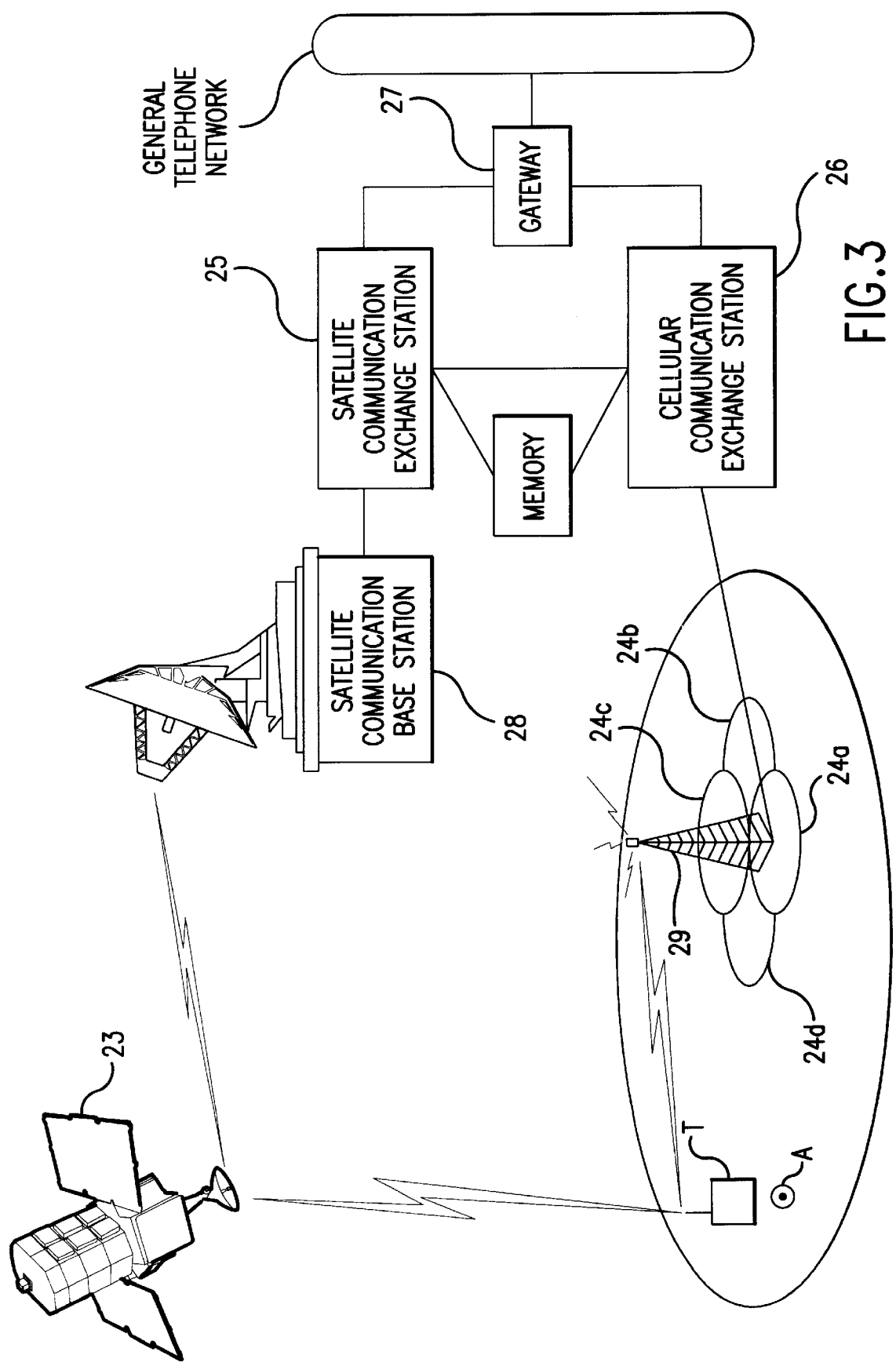
FIG. 3 is a conceptual diagram of a mobile communication system in accordance with the invention, and in which the mobile communication unit shown in FIGS. 1 and 2 is used.

A mobile communication system in accordance with the present invention is schematically shown in FIG. 3. For example, the mobile communication unit shown in FIGS. 1 and 2 is used in this mobile communication system. The mobile communication system in accordance with the present embodiment consists of two communication systems (i.e., a satellite communication system using communications satellites 23 (only one is shown) and a cellular communication system). The cellular communication system provides a service area 24 consisting of overlapping cells 24a–24d. In the present mobile communication system, the cellular communication system provides local service areas, while the satellite communication system provides global coverage. In practice, plural satellite stations 23 are placed in a given orbit around the earth, thus providing full coverage to the service area of the satellite communication system.

In this mobile communication system, the service area of the cellular communication system that the user can use is normally determined by the cellular communication service provider and the contents of a contract. Therefore, in the present and following embodiments, the service area information of the cellular communication system with which the present location of the unit itself is compared means information of the service area available to users according to the contract with the cellular communications service provider as mentioned above. The same can be applied to the explanation of each embodiment.

Accordingly, in the mobile communication unit in accordance with the present invention, even if the present location of the unit itself physically is within the service area of the cellular communication system, the unit does not judge that the present location of the unit itself is within the service area of the cellular communication system unless the service area is permitted by the contents of the contract with the service provider. In this case, the services of the satellite communication system is continued. Where the service area is not the contracted service area, even if the reception is switched to the services of the cellular communication system, the communications services of the cellular communication system cannot be received. That is, information about the service area based on the aforementioned contract is stored in the memory 17 of the mobile communication unit shown in FIG. 2.

The communication systems are interconnected via their respective exchange stations 25 and 26 and via a gateway 27, so that information is exchanged between the systems via these means. In the present embodiment, a cellular phone system is taken as an example of the cellular communication system. This communication method can be applied to any desired method. It is to be understood that the present invention is not restricted to mobile communication systems using a certain communication method.

The operation of the mobile communication system and mobile communication unit in accordance with the present embodiment is next described by referring mainly to FIG. 3. An operation for switching the service reception mode when a mobile communication unit T moves in accordance with the present embodiment from the satellite communication system to the cellular communication system will be described in further detail by referring to FIG. 4.

Referring to FIG. 3, if the mobile communication unit T in accordance with the present embodiment is close to a location A lying outside the service area 24 (24a–24d) of a cellular communication system, the mobile phone controller 18 of the mobile communication unit already described in connection with FIGS. 1 and 2 selects services from the satellite communication system and starts to operate the satellite communication system. Thus, the unit receives the services from the satellite communication system. In particular, a phone number of a person to whom the user wants to talk can be entered from the man-machine interface 15, and the user can make a request (make a call) for connection of this phone with the network to the satellite communication wireless base station 28 that is a satellite communication base station. When a connection request arrives through the satellite communication wireless base station 28 and the satellite station 23, the unit can respond (get a call). Referring still to FIG. 3, if the mobile communication unit T makes a request for connection with an other user, this calling request signal is sent to the satellite communication base station 28 and to the satellite communication exchange station 25 via the satellite station 23. If the called user is within the service area 24 of the cellular communication system, for example, this calling request is sent to the user lying within the service area 24 of the cellular communication system via the cellular phone exchange station 26 and via the cellular communication base station 29. If the user is an ordinary fixed telephone user, the signal is sent to the general telephone network via the gateway exchange station 27.

Figure 4:
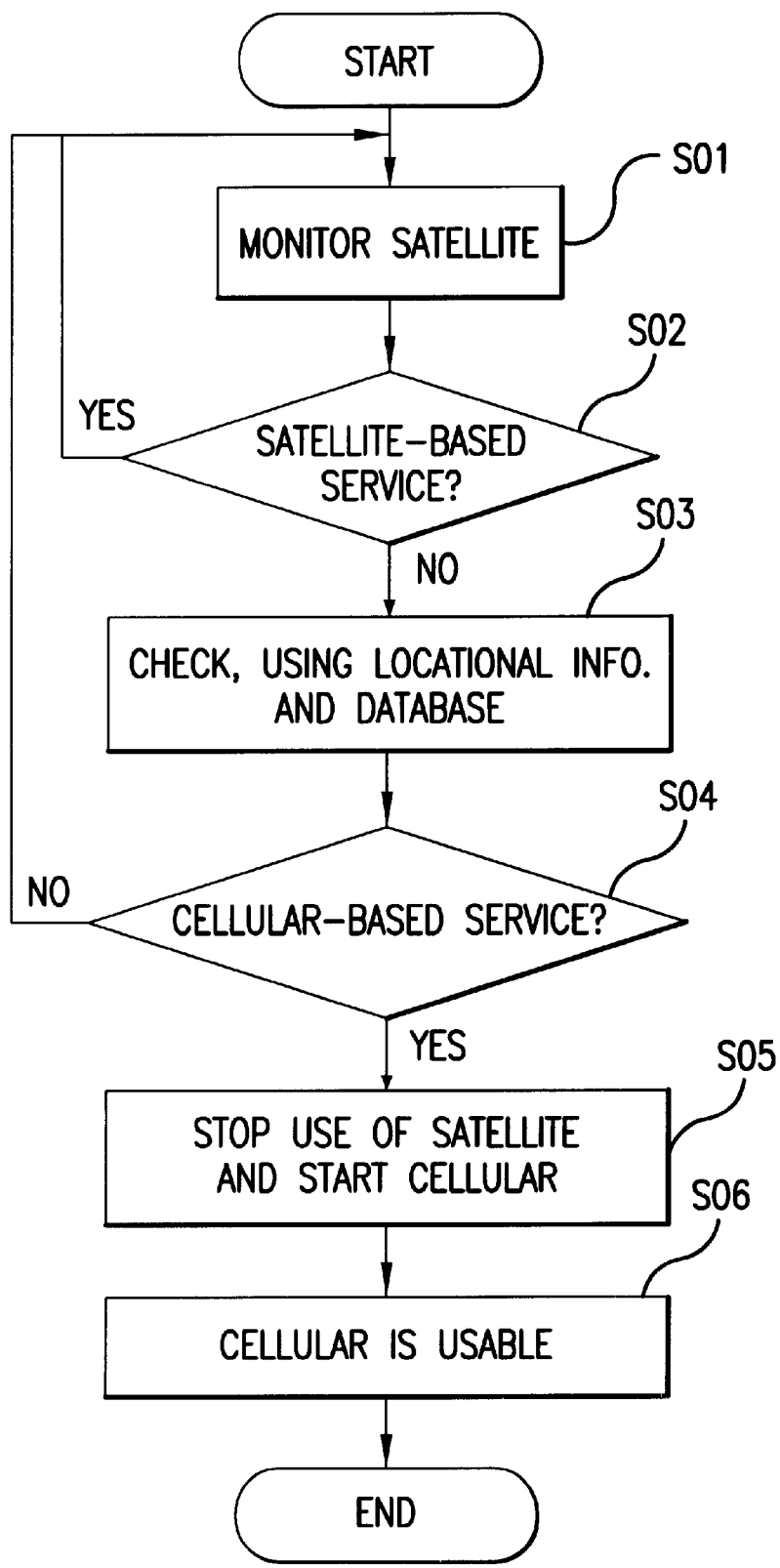
FIG. 4 is a flowchart illustrating a sequence of operations performed by the mobile communication unit shown in FIG. 1.

Now, referring to FIG. 4, the mode switching operation caused by the movement of the mobile unit into the service area 24 from out of the service area 24 of the cellular communication system, that is, the switching operation of the services is described in detail. FIG. 4 is a flowchart illustrating a sequence of operations for switching the communication mode of the mobile communication unit in accordance with the present embodiment illustrated in FIGS. 1 and 2.

In the mobile communication unit in accordance with the present invention, if the present location of the mobile communication unit itself is in the location A lying outside the service area 24 of the cellular communication system as shown in FIG. 3, the mobile phone controller 18 makes the satellite communication system operate in, and the unit receives the services of, the satellite communication system. At the same time, the controller causes the state monitor 19 to operate to monitor whether the state of services from the satellite communication system has deteriorated (step 01). If the state monitor 19 detects the deterioration in the state of services from the satellite communication system (e.g., the reception field intensity is lower than a preset threshold value), the state monitor 19 informs the main controller 22 that a cause of unavailability of the services has occurred on the part of the satellite communication system. The main controller 22 starts processing for switching the mode of the communication system. If deterioration of the services from the satellite communication system is not detected, the state monitor 19 informs the main controller 22 that there is no cause of unavailability of use of the services. The main controller 22 maintains the services from the satellite communication system (step 02).

If an instruction for switching the state of the services from the communication system arrives from the state monitor 19, the main controller 22 instructs the decision circuit 20 to make a decision as to whether the present location of the unit itself is within the service area of the cellular communication system. If there is an instruction from the main controller 22, the decision circuit 20 fetches information about the service areas of the cellular communication systems from the memory 17 and makes a decision based on the fetched information about the service areas and on the information sent from the satellite communication wireless base station 28 as to whether the present location of the unit itself is within the service areas of the cellular communication systems (e.g., as to whether the location is within the service area 24 as shown in FIG. 3) (step 03). If the result of the decision is YES (i.e., the present location is located within the service area of a cellular communication system), the decision circuit 20 determines that the unit can receive the communications services of the cellular communication system and instructs the main controller 22 to switch the mode of services of the communication system. If the result of the decision is that the present location of the unit itself is outside the service area of the cellular communication system, the decision circuit 20 determines that the unit cannot receive the communications services of the cellular communication system and orders the main controller 22 to inhibit switching of the mode of services of the communication system (step 04).

One example of the method of recognizing the present location of the mobile communication unit itself is next described, the unit being built in accordance with the present embodiment. The same principle applies to other embodiments of the invention and so the description of the method will be omitted in the description of the other embodiments. As mentioned above, the mobile communication unit 28 in accordance with the present embodiment obtains information about the present location of the unit from the satellite communication wireless base station 28. It is assumed that the mobile communication unit T shown in FIG. 3 is receiving the services of the satellite communication system, i.e., is waiting for communications through the satellite communication system. Under this condition, the unit T requests the satellite communication wireless base station 28 to send information about the present location of the unit itself via the satellite station 23 at regular intervals of time. The satellite communication wireless base station 28 receiving the request calculates the present location (consisting of data about the longitude and altitude) of the mobile communication unit that has made such a request, from data about the cell of the satellite communication system that has made such a request and from the time taken for the request to arrive at the satellite communication wireless base station 28. More specifically, the satellite communication wireless base station 28 can roughly grasp the present location by identifying which cell has made such a request for information about the location. It also can recognize the precise location of the mobile communication unit T as follows. The time (hereinafter referred to as the arrival time) taken for the request for information about the location to arrive is compared with a reference arrival time (i.e., the time taken for the request to arrive after the request is sent from the center of the cell), thus producing an arrival time difference. Motion of the satellite station 23 produces a Doppler effect. Based on the arrival time difference and the Doppler effect, the present location of the mobile communication unit can be determined accurately.

The mobile communication unit in accordance with the present embodiment can thus periodically check the present location of the unit itself during movement without the need to provide any special configuration for identifying the location of the unit itself like a GPS receiver. If connection with the satellite communication system is permitted and conversation with an other user is started, the present location of the mobile communication unit T is grasped by the satellite communication base station without making a request for sending locational information subsequently. The intervals at which a request for sending locational information is made as described above may be set shorter where the unit moves at a relatively high speed such as a car phone. The intervals may be set longer where the moving speed is relatively slow.

If an instruction for switching the mode of services from the communication system is given from the decision circuit 20, the main controller 22 causes the switching controller 21 to switch the mode of reception from the services of the satellite communication system to the services of the cellular communication system (step 05). If an instruction for inhibiting switching of the mode of reception is given, the main controller instructs the switching controller 21 to maintain the present services of the satellite communication system. Then, control goes back to step 01.

If an instruction for switching the reception from the services of the satellite communication system to the services of the cellular communication system is given from the main controller 22, the switching controller 21 switches a switching mechanism (not shown) to stop the operation of the satellite communication circuit. The cellular communication circuit is operated to permit the mobile communication unit to receive the services of the cellular communication system (step 06). In particular, the power supply to the satellite communication circuit is stopped to stop its operation. Electric power is started to be supplied to the cellular communication circuit. If the cellular communication circuit is started to the operated to receive the services from the cellular communication system, exchange of conversational signals and so on between the satellite communication circuit and the audio interface 16 is replaced by exchange between the cellular communication circuit and the audio interface 16.

When the mobile communication unit in accordance with the present embodiment is receiving the services of the satellite communication system, if the reception of communications services is judged to be difficult due to deterioration of reception from the satellite communication system, at first, a decision is made as to whether the communications services of the cellular communication system can be received. The services are not switched between the communication systems until it is confirmed that the communications services of the cellular communication services can be received. Rather, services of the satellite communication system are maintained as it is. Hence, wasteful switching of services can be prevented. Therefore, mobile communication unit and mobile communication system of improved continuity can be offered to the user. Furthermore, electric power consumption caused by wasteful switching of the mode can be suppressed. Consequently, a mobile communication unit with reduced power consumption can be provided.

In addition, if the service area information unit which the present location information of the mobile communication unit is compared in the decision circuit 20 is arranged to be selectively limited to certain regions by, for example, an input operation via the man-machine interface 15 or the like (if information identifying regions is attached to information about services area stored in the memory 17, different pieces of service area information can be distinguished and selected), it becomes possible to reduce the time and electric consumption required for the decision processing in the decision circuit 20 and in turn to prolong the waiting time and talk time.

In the present embodiment, the information about the service areas of the cellular communication system that is compared by the decision circuit 20 with the information about the present location of the unit itself is stored in the common memory 17, along with telephone numbers and contents of conversations. The inside of the memory 17 is partitioned into blocks assigned to telephone numbers, shortened numbers, and information about the service areas, respectively. This memory 17 may be constituted by two or more storage means in order to store only the service area information of the cellular communication system independently of other contents. Alternatively, the storage means holding information about the service areas of the cellular communications services can be a memory card that can be replaceably plugged into the body of the mobile communication unit such as a smart card. In this case, the mobile communication unit can obtain information about the service areas of the cellular communication system against which the present location of the unit itself is compared in the decision circuit 20, by inserting a storage means holding the information about the service areas in the body of the unit without the need to previously store the information about the service areas in the memory 17.

The service areas of the cellular communication system can be enlarged or modified according to the expansion of the communications services. In order that the decision circuit 20 precisely judge the present location of the unit itself relative to the service areas that are subject to enlargement and modification as described above, it is necessary to update the information about the service areas whenever the service areas are enlarged or modified, the information being compared with the present location of the unit itself. If such updated information about the service areas is stored in a replaceable storage means such as a smart card or the like, the present location of the unit itself can be judged precisely according to the continually updated information about the service areas simply by plugging the storage means into the body of the unit. Furthermore, a relatively cumbersome operation consisting of rewriting the service area information stored in the memory 17 whenever updating is done can be circumvented.

Where the memory 17 is made of the replaceable storage means as described above, it is not necessary to store all information about all the contracted service areas in a single storage means. For example, plural similar storage means may be provided, and information about each individual region such as a major city or a nation may be stored in each storage means. In this case, the user of the mobile communication unit in accordance with the present embodiment can appropriately select a storage means holding information about the service areas that cover the service regions of the mobile communication unit and plug it into the unit. This reduces the amount of information stored in the memory 17. Therefore, the service area compared against the present location of the unit itself are limited. Hence, the time taken for the decision circuit 20 to make a decision can be shortened. This also leads to power consumption saving.

The memory 17 of the mobile communication unit in accordance with the present embodiment as described above is preferably a nonvolatile memory capable of holding the contents of the memory for a given period of time after the power supply is interrupted. Where the memory consists of such a nonvolatile memory, if the power supply to the memory is interrupted for a long time due to failure of the power supply, for example, the memory contents can be retained.

a mobile communication unit in accordance an other embodiment of the invention is next described by referring to FIGS. 5–8. Note that like components are denoted by like reference numerals in various figures and that those components which have been already described will not be described below. The mobile communication system in accordance with the present embodiment, the description of which is omitted, is fundamentally the same as that shown in FIG. 3.

Figure 5:
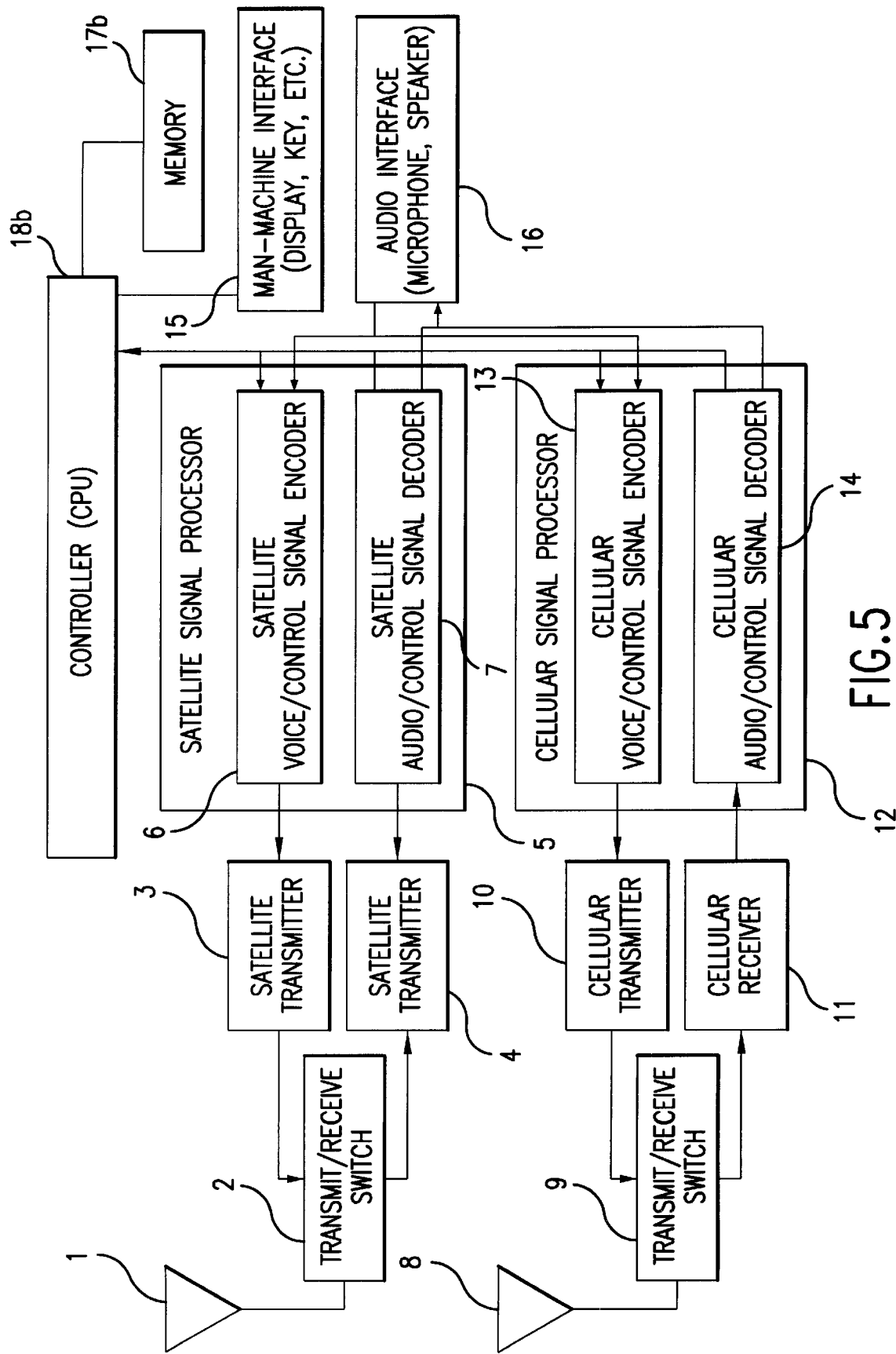
FIG. 5 is a block diagram of a mobile communication unit in accordance with a second embodiment of the present invention.
Figure 6:
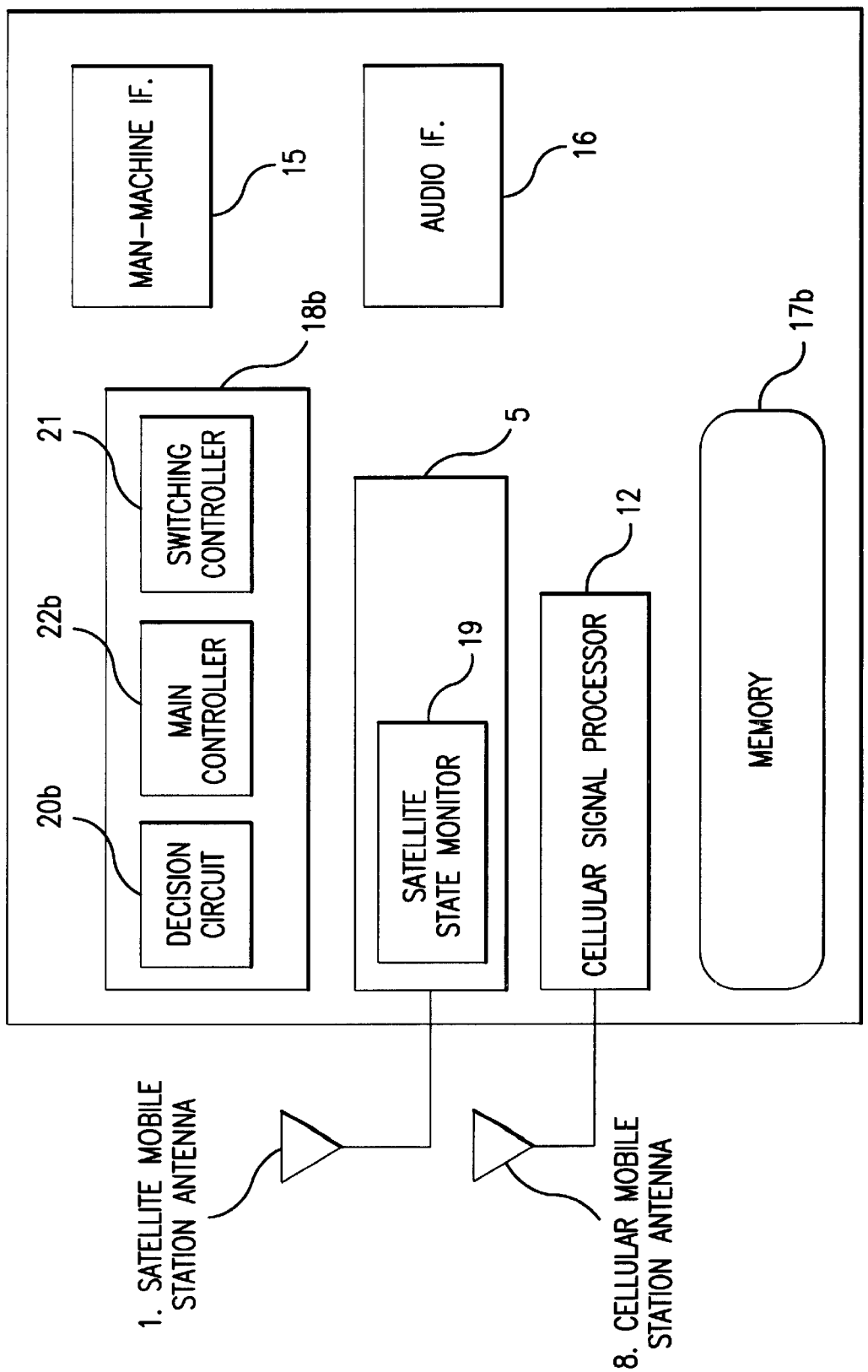
FIG. 6 is a block diagram of main operational components of the mobile communication unit shown in FIG. 5.

FIG. 5 is a block diagram of the mobile communication unit in accordance with the second embodiment of the invention. FIG. 6 is a block diagram of main operational components of the mobile communication unit shown in FIG. 5. The unit shown in FIG. 5 is similar to the unit shown in FIG. 1 except that a memory 17b stores information about locations at which a connection is made and not made, respectively, with the cellular communication system within the service areas of the cellular communication system, as well as information about the service areas of the cellular communication system, and that a mobile unit controller 18b has a decision circuit 20b and a main controller 22b. The decision circuit 20b makes a decision based on the connection information stored in the memory 17b as to whether the present location of the unit itself is in a connected location or in an unconnected location. The main controller 22b controls switching done by the switching controller 21 according to the result of the decision made by the decision circuit 20b.

In the mobile communication unit in accordance with the present embodiment, if the present location of the unit itself is judged to be a location at which the connection request with the cellular telephone network has failed before, the state of reception of the satellite communication system is not altered until the present location of the unit itself is judged to be a connection location capable of making communications by the cellular communication system even when the present location is judged to be within the service area of the cellular communication system. Therefore, this mobile communication unit can prevent undesired mode switching and cellular processing more effectively than the mobile communication unit in accordance with the first embodiment. Furthermore, a mobile communication unit of improved continuity can be offered to the user. In addition, power consumption caused by wasteful mode switching can be suppressed. In consequence, a mobile communication unit with less power consumption can be provided.

Figure 7:
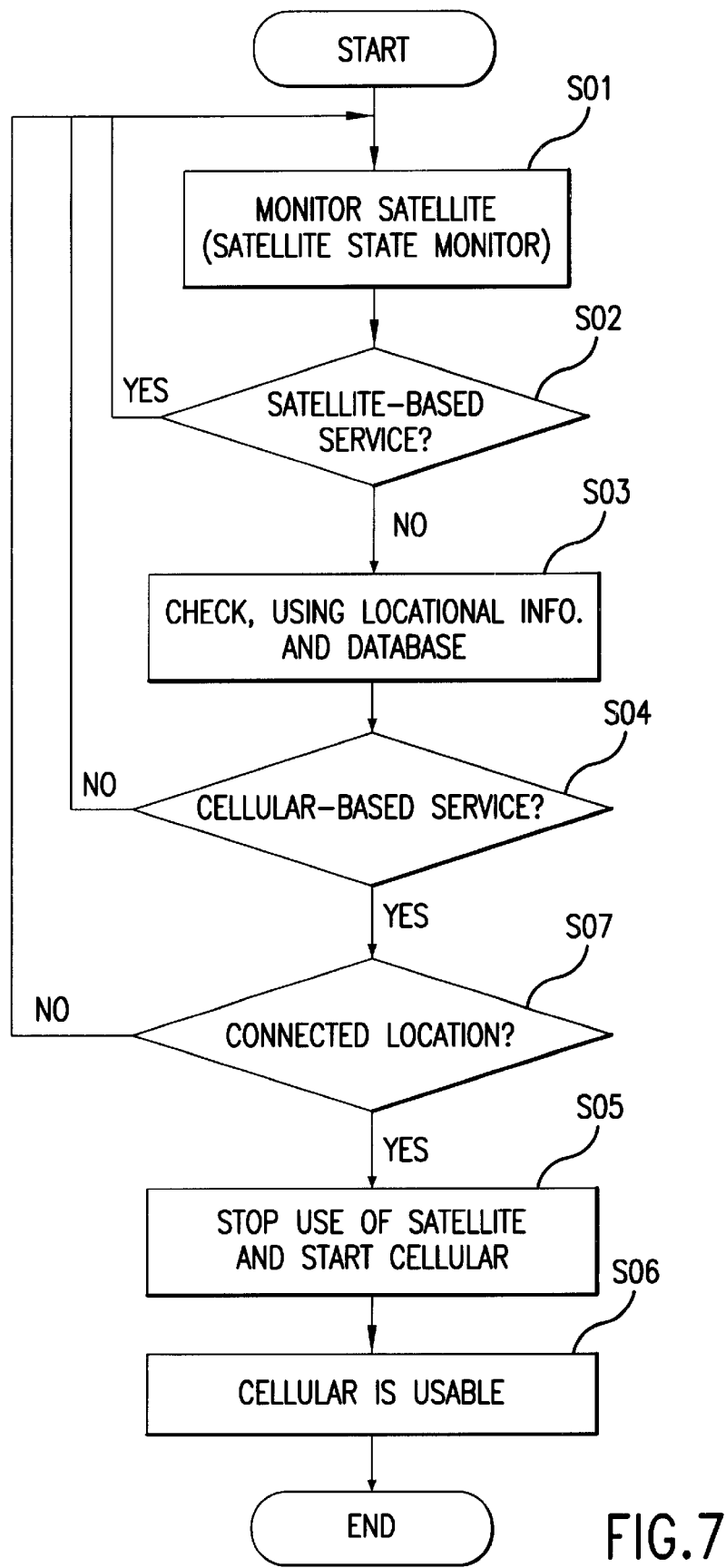
FIG. 7 is a flowchart illustrating a sequence of operations performed by the mobile communication unit shown in FIG. 5.

FIG. 7 is a flowchart illustrating the operation of the mobile communication unit shown in FIGS. 5 and 6. The decision circuit 20 of the mobile communication unit shown in FIG. 2 performs steps 03 and 04 illustrated in FIG. 4. The mobile communication unit in accordance with the present embodiment has a decision circuit 20b that performs step 07 to make a decision as to whether the present location of the unit itself is in a connected location or in an unconnected location with the cellular communication system within the service areas of the cellular communication system, in addition to steps 03 and 04 described above.

In particular, in the mobile communication unit in accordance with the present embodiment, even if the decision circuit 20b judges that the present location of the unit itself is within the service area of the cellular communication system, the mode of reception is not immediately switched from the services of the satellite communication system to the services of the cellular communication system. Then, the decision circuit makes a decision as to whether the present location of the unit itself is in a connected location or in an unconnected location within the service areas of the cellular communication system. If the result of the decision is that the present location of the unit itself is in an unconnected location, this location is judged to be the location at which the connection with the cellular communication base station 29 is difficult although the present location of the unit itself is within the service area of the cellular communication system. Control returns to step 01. Control does not proceed to step 05 until the present location of the unit itself is in a connected location. Then, the services of the satellite communication system is stopped. The reception is switched from the services of the satellite communication system to the services of the cellular communication system (step 05).

The mobile communication unit in accordance with the present embodiment yields the same advantages as the mobile communication unit in accordance with the first embodiment and in addition, the unit can switch the mode of operation according to the real switching condition of the received services between these modes.

Figure 8:
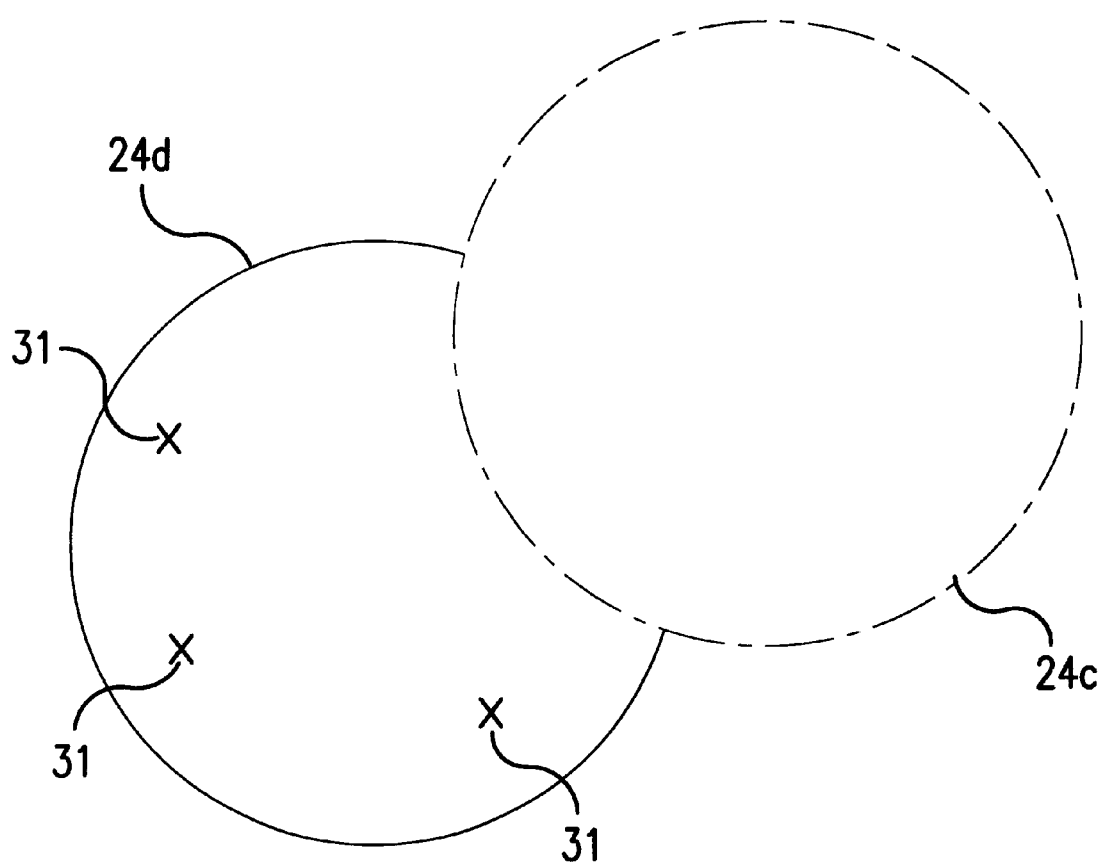
FIG. 8 is a schematic diagram illustrating connected locations and unconnected locations within the service area of a cellular communication system.

FIG. 8 conceptually illustrates connected locations and unconnected locations within the service areas of cellular communications systems. The unconnected locations are indicated by 31. The others are connected locations. As shown in FIG. 8, even if the unit is located within the service area of the cellular communication system, a service request from the mobile communication unit to a cellular communication base station 29 may not be complied with by the effects of terrain within the service area (e.g., hills, buildings, etc.). In the mobile communication unit in accordance with the present embodiment, such a connection request location is stored in the memory 17b as an unconnected location 31. This registration of the unconnected location 31 in the memory 17b may be performed as follows. The reception is switched from the services of the satellite communication system to the cellular communication system, and then a request for connection with the cellular communication base station 29 is made. If this request for connection is not complied with, the location may be stored as an unconnected location in the memory 17b. Alternatively, the number of failures of connection with the cellular communication system base station 29 in a location may be counted. If the number exceeds a given value, this location is judged to be a location that cannot offer easy connection with the base station 29, and this location is stored as an unconnected location in the memory 17b.

The number of unsuccessful requests for connection with the network is counted in a location, and this location is taken as an unconnected location to improve the accuracy of the decision made in step 07. After only one failure, it cannot be judged whether the next request for connection with the network is not complied with. However, where successive failures occur, it is considered that this phenomenon is affected by terrain or the like in the service area. Therefore, it is objectively judged that it is a location at which easy connection with the network cannot be offered.

The memory 17b of the mobile communication unit in accordance with the present embodiment may be made of a storage means similar to that used in the above-described embodiment, such as a nonvolatile memory.

Figure 9:
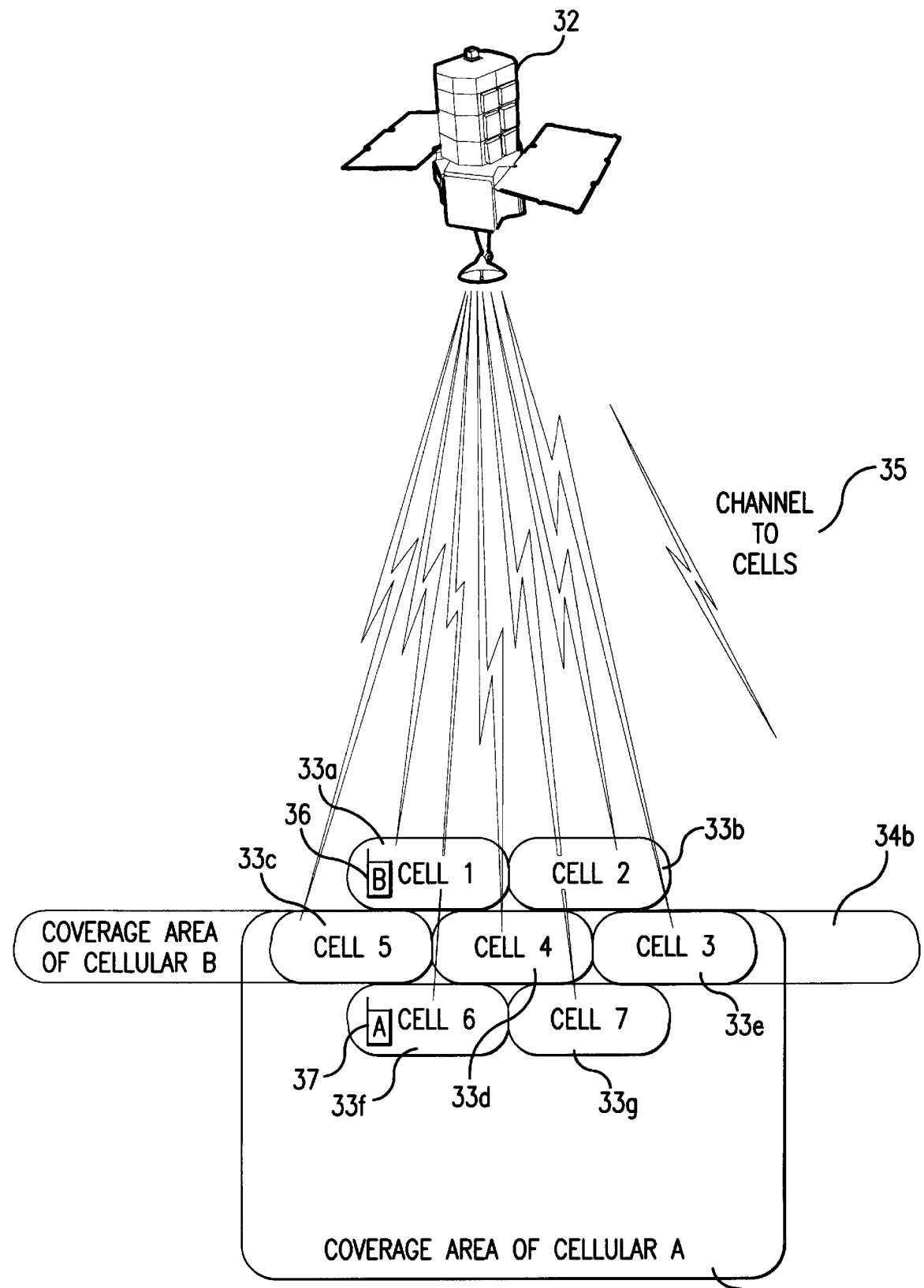
FIG. 9 is a conceptual diagram illustrating a mobile communication system in accordance with a third embodiment of the present invention.
Figure 10:
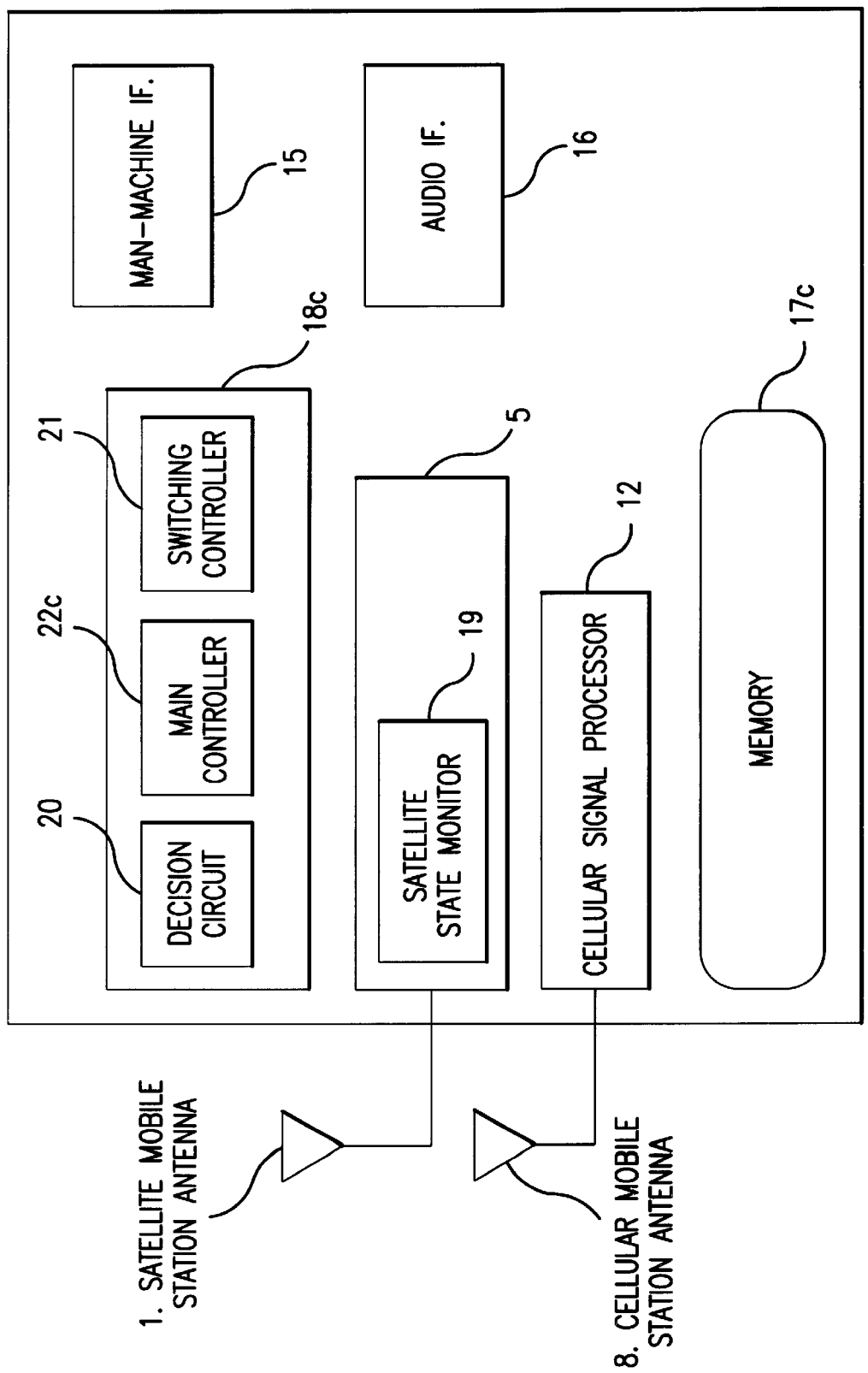
FIG. 10 is a block diagram of the mobile communication unit used in the mobile communication system shown in FIG. 9.

A mobile communication system and a mobile communication unit in accordance with a further embodiment of the present invention are next described by referring to FIGS. 9 and 10. In the mobile communication units in accordance with the first and second embodiments described above, a memory previously loaded with information about service areas of a cellular communication system is mounted in the body of each unit or replaceably plugged in the body to obtain information about the service areas of the cellular communication system. With such a mobile communication unit for obtaining information about the service areas of the cellular communication system by the use of the structure described above, whenever the service areas of the cellular communication system are enlarged or modified, the user must update the information about the service areas stored in the memory or replace the memory by another memory holding information about new service areas. Thus, considerably cumbersome operations are required.

According to the present embodiment, a mobile communication unit which can obtain information about the service areas of a cellular communication system without the need to update information about the service areas or to replace the memory and can make a decision based on the information obtained in this way as to whether the present location of the unit is within the service areas of the cellular communication system is provided. The present embodiment also provides a mobile communication system exploiting such a mobile communication unit. Description of such mobile communication units and system will be given now.

FIG. 9 shows a mobile communication system in accordance with the present invention similarly to FIG. 3. FIG. 9 is a conceptual diagram illustrating the mobile communication system in accordance with the present embodiment in which information about the service areas of a cellular communication system is sent to the user (i.e., the mobile communication unit) by making use of a satellite communication system. FIG. 10 is a block diagram of the mobile communication unit in accordance with the present embodiment, the unit being used in the mobile communication system in accordance with the present embodiment as illustrated in FIG. 9. Notice that like components are indicated by like reference numerals in various figures and that those components which have been already described will not be described below.

Referring to FIG. 9, a satellite station 32 receives information about the service areas of a cellular communication system from a satellite communication base station of a satellite communication system and routes the information to cells such as 32a–33g forming the service areas of the satellite communication system. The cells 33a–33g and other cells (not shown) are formed by the satellite station 32 and move as the satellite station 32 moves. While only one satellite station 32 is shown in FIG. 9, many satellite stations are placed in an orbit around the earth and form numerous cells that provide global coverage. The cellular communication system has service areas 34a and 34b partially overlapping with the satellite communication cells 33a and 33g, respectively. A so-called common control channel 35 is formed between the satellite station 32 and each of the cells 33a–33g and receives, for example, the information about the service areas of the cellular communication system. Mobile communication units 36 and 37 are used in the mobile communication system in accordance with the present embodiment and carried by users of this mobile communication system.

In the mobile communication system in accordance with the present embodiment, the information about the service areas of the cellular communication system sent from the satellite station 32 to the cells 33a–33g is, specifically, the information about the service areas formed by the cellular communication system and overlap with each other. Each cell is informed of information about the corresponding service areas of the cellular communication system. For example, the cells 33c–33e (FIG. 9) of the satellite communication system are within coverage areas of cellular communication systems A and B. Since they are within both service areas of the cellular systems A and B and so the cells are informed of information about their service areas. Since cells 33f and 33g are not within the coverage area of the cellular communication system B, they are informed of information about only the cellular communication system A. The mobile communication units in accordance with the present embodiment receive the information about the cellular communication systems that is directed to the respective cells and thus they can obtain information about the service areas of the cellular communication system. Therefore, it is not necessary to have a memory within the unit, the memory being previously loaded with information about the service areas of the cellular communication systems.

As the satellite station 32 moves, the cells 33a–33g of the satellite communication system shown in FIG. 9 move. Since the cells are informed of information about the overlapping service areas of the cellular communication system respectively, even if the cells of the satellite communication system are moved by movement of the satellite station 32, those cells lying within the coverage area of the cellular system A are always informed of information about the service areas of the cellular communication system A. The mobile communication units located within the coverage area of the cellular system A can obtain information about the service areas of the cellular communication system A via the cells of the satellite communication system overlapping with the cellular communication system A.

In FIG. 9, satellite communication base stations and cellular communication base stations are omitted, however, in the mobile communication system in accordance with the present embodiment, the cellular communication systems and the cellular satellite communication system are connected via their respective exchange stations 25, 26 and gateway exchange station 27 in the same way as in FIG. 3. Information about the service areas of the cellular communication system is sent from the cellular communications systems to the satellite communication system through the aforementioned gateway exchange station 27 between the communication systems.

The operation of the mobile communication system in accordance with the present embodiment is next described. In the mobile communication system in accordance with the present embodiment, information about the service areas of the cellular communication system is first sent from the round base stations of the cellular communication system to the satellite communication base stations of the satellite communication system and then to the satellite station 32. As mentioned above, the common control channel 35 is formed between the satellite station 32 and each of the cells 33a–33g of the satellite communication system. The information about the service areas of the cellular communication system is sent to the satellite station 32, which in turn routes the information to the respective cells of the satellite communication system via this common control channel 35. The mobile communication units 36 and 37 shown in FIG. 9 receive the information via the satellite mobile station antenna 1, the information being sent via the satellite station 32 and the common control channel 35 in this way.

In FIG. 9, only one satellite station 32 and limited number of cells formed by the satellite station 32 are illustrated. In a practical system, numerous satellite stations 32 are placed in an orbit around the earth. Innumerable cells formed by the satellite stations 32 provide global coverage, thus forming service areas of the satellite communication system. The mobile communication unit in accordance with the present embodiment can obtain information about the service areas of the cellular communication systems and can communicate with other users wherever the unit is located in the world.

The operation of the mobile communication unit is now described. As shown in FIG. 10, this mobile communication unit in accordance with the present embodiment has a memory 17c previously loaded with information about the service areas of cellular communication systems. Information about the service areas of the cellular communication systems is sent to the cells, for example 33a–33g forming the service area of the satellite communication system, and the mobile communication unit receives this information, thus obtaining the information about the service areas of the cellular communication systems. The obtained information about the service areas is processed by a satellite signal processor 5 and then temporarily stored in the memory 17c via the mobile unit controller 18c. As described later, whenever the location of the mobile communication unit moves, the unit is arranged to receive information about the service areas of the cellular communication systems corresponding to the location from the satellite station so that it is not necessary that the memory 17c be a nonvolatile memory, unlike the mobile communication units in accordance with the above embodiments. The memory is made of a rewritable storage means that holds data temporarily.

If information about the service areas of the cellular communication system is stored in the memory 17c, each of the mobile communication units 36 and 37 makes a decision as illustrated in FIG. 4 using the information temporarily held in the memory 17c. This decision is used to judge whether the present location of the unit itself is within the service areas of cellular communication systems.

If the decision circuit 20 of the mobile communication unit 36 shown in FIG. 9 carries out the decision processing, the present location of the unit 36 is judged to be outside the service areas of the cellular communication systems, because no information about the service areas of the cellular communication systems is stored in the memory 17c of the mobile communication unit 36. This unit 36 maintains the services of the satellite communication system. If the decision circuit 20 of the mobile communication unit 37 makes the decision processing, the present location of the unit 37 is judged to be within the service area 34a of cellular communication system A, because information about the service area of cellular communication system A is stored in the memory 17c of the mobile communication device 37. The present location is judged to be outside service area 34b. the switching controller 21 is instructed to switch the reception from the services of the satellite communication system to the services of the cellular communication system A.

After the services of communication system is switched in this way in the mobile communication unit 37, the mobile phone controller 18 is operating the cellular communication means of the cellular signal processor 12 and other means. Under this condition, if the user enters a telephone number of other user and makes a call, the mobile communication unit 37 sends a connection request signal for location registration and connection to the cellular communication base stations of the cellular communication system A forming the service area A via the cellular communication means including a cellular transponder. Conversely, if a third party makes a request for connection with the network, the request signal is sent from the cellular communication base station of the cellular communication system A forming the service area 34a to the mobile communication unit 37 lying within the service area 34a.

Accordingly, in the mobile communication system in accordance with the present embodiment, information about the service areas of the cellular communication systems is sent to the service area of the satellite communication system at regular intervals of time using the satellite communication system, as described above. Therefore, if the mobile communication units 36 and 37 have their memories 17c not previously loaded with information about the service areas of the cellular communication system, they can obtain service area information with which the present location of the unit itself is compared in the decision circuit 20, by receiving information about the service areas of the cellular communication systems and storing the informing in the memories 17c temporarily. Furthermore, if the service areas of the cellular communication systems are enlarged or modified, the new information is sent to the service area of the satellite communication system by making use of the satellite communication system. Therefore, the users of the mobile communication units 36 and 37 can update the information about the service areas without the need to take any measure for updating. Consequently, the reception can be made with improved continuity from the services of the satellite communication system to the services of the cellular communication systems in response to the information about the service areas of the obtained cellular communication systems.

In this case, whenever new information about the service area corresponding to the present location of the unit itself is received, the contents of the memories 17c of the mobile communication units 36 and 37 representing information received in a location assumed in the past are replaced by the newly received information about the service area.

In this way, in the mobile communication system in accordance with the present embodiment, information about the service areas of the cellular communication systems is supplied to the satellite communication system at regular intervals of time via the cellular telephone base station of the cellular communication system and then sent to the cells forming the service area of the satellite communication system. Since the mobile communication units in accordance with the present embodiment are designed to receive service area information sent via the satellite station 32 of the satellite communication system and to store it in the memory 17c temporarily, if a memory loaded with a database holding information about the service areas of the cellular communication systems is not mounted, information about the service area of the cellular communication system best adapted for that location can be derived. Consequently, wasteful switching of the services can be prevented in the same way as the mobile communication unit in accordance with the first embodiment described above. Hence, mobile communication units and mobile communication system with improved continuity can be offered to users. Since wasteful switching of the reception can be prevented, electric power consumption can be reduced. In consequence, mobile communication units with less power consumption can be provided.

In the mobile satellite communication system in accordance with the present embodiment, the satellite communication base station of the satellite communication system controls the satellite station 32 to periodically send information about the service areas of the cellular communication system to the cells of the satellite communication system, however, the satellite station 32 may be so controlled that the satellite communication base station monitors the cell having a mobile communication unit that makes a request for registration and that information about the service area of the corresponding cellular communication system is sent to the cell where such a request is made.

What is claimed is:

1. A mobile communication unit adapted to receive communications services of a cellular communication system within a service area of the cellular communication system and to receive communication services of a satellite communication system outside said service area, said mobile communication unit comprising:
   a state monitor for monitoring field intensity of signals received from said satellite communication system;
   a memory in which information about the part of a service area of said cellular communication system which a user can use in accordance with a contract between the use and a cellular communication system provider is stored;
   a decision circuit which, if said state monitor detects a decrease of said field intensity below a threshold value, makes a decision based on present location information of the mobile unit sent from said satellite communication system and said information stored in said memory as to whether the present location of the unit itself is located within said part of said service area of the cellular communication system; and
   a switching controller which, if said present location of the unit itself is decided to be outside said part of said service area by said decision circuit, maintains the services of said satellite communication system, and switches the state of reception from said services of said satellite communication system to the services of said cellular communication system if said present location of the unit is decided to be within said part of said service area.

2. A mobile communication unit of claim 1, wherein said decision circuit makes a decision as to whether the present location of the unit itself is located within a selected service area.

3. A mobile communication unit of claim 1, wherein said memory consists of a replaceable storage means that is plugged in the body of said mobile communication unit.

4. A mobile communication unit of claim 3, wherein said memory consists of a replaceable nonvolatile memory for holding contents of storage for a given period if power supply is interrupted.

5. A mobile communication unit of claim 1, wherein said memory consists of a nonvolatile memory for holding contents of storage for a given period if power supply is interrupted.

6. The mobile communication unit of claim 1, wherein said memory further stores line connection information about connected and unconnected locations with said cellular communication system within said part of said service area; and
   if said decision circuit decides that the present location of the unit itself is located within said part of said service area of the cellular communication system, further makes a decision based on said line connection information as to which of said connected and unconnected locations is the present location of the unit itself within said part of said service area.

7. The mobile communication unit of claim 1, wherein information about said part of said service area of said cellular communication system is sent to said service area of said satellite communication system via said satellite station and is inputted into said memory of said mobile communication unit.

* * * * *

UNITED STATES PATENT AND TRADEMARK OFFICE
CERTIFICATE OF CORRECTION

PATENT NO. : 6,181,952 B1
DATED : January 30, 2001
INVENTOR(S) : Makoto Murata

It is certified that error appears in the above-identified patent and that said Letters Patent is hereby corrected as shown below:

Column 17,
Line 53, "use" should be -- user --.

Signed and Sealed this

Fifth Day of February, 2002

Attest:

JAMES E. ROGAN
*Director of the United States Patent and Trademark Office*

*Attesting Officer*